Patented June 8, 1948

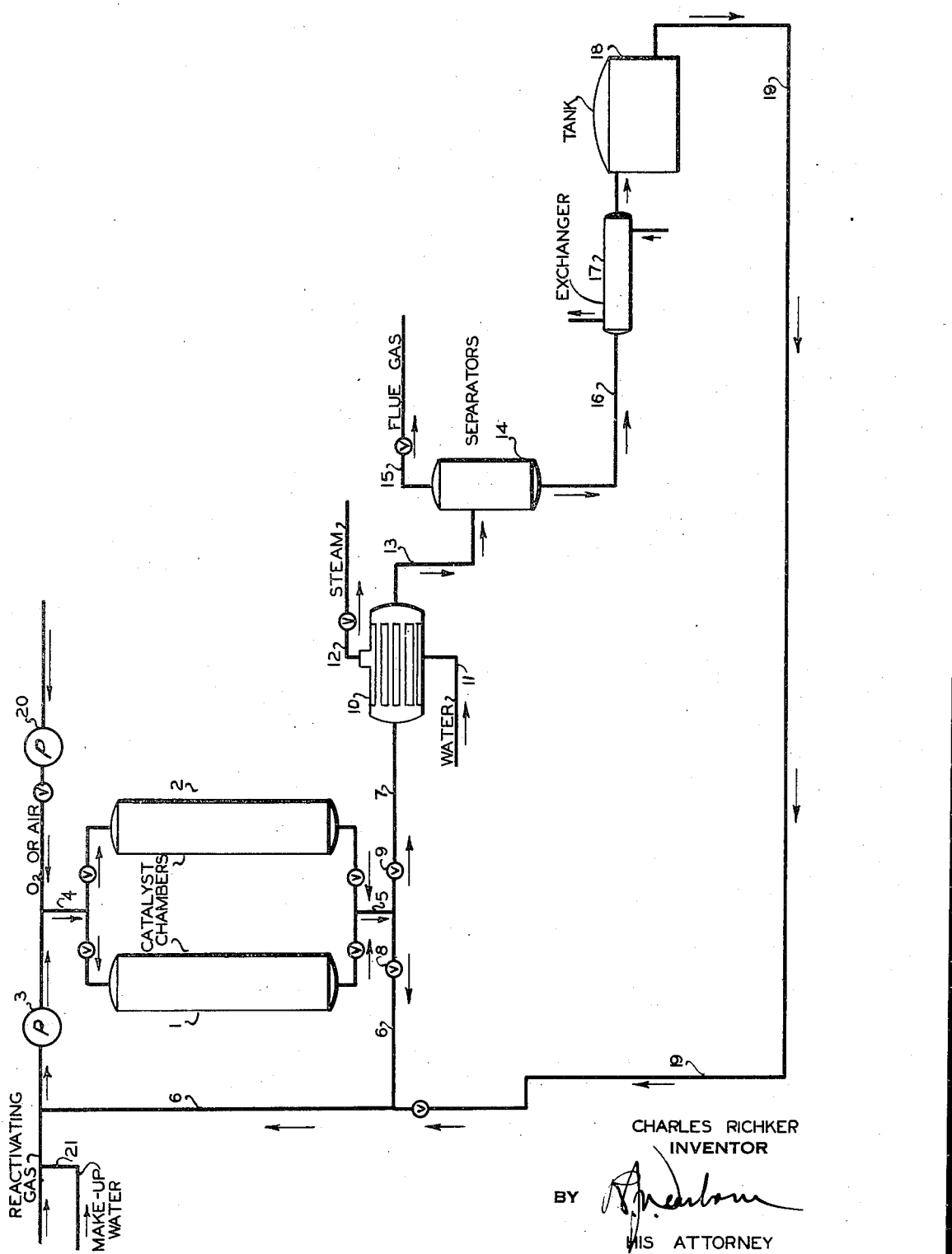

2,443,056

UNITED STATES PATENT OFFICE 2,443,056

CATALYST REACTIVATION

Charles Richker, Port Arthur, Tex., assignor to The Texas Company, New York, N. Y., a corporation of Delaware Application October 25, 1943, Serial No. 507,549

2 Claims. (Cl. 252—242)

This invention relates to the reactivation of a solid catalyst such as employed in the conversion of hydrocarbons.

The invention has to do with the reactivation of solid, granular type catalysts such as used in the conversion of hydrocarbons, as, for example, the catalysts used for cracking or transforming hydrocarbons into valuable gasoline hydrocarbons. In the catalytic cracking of hydrocarbons of higher molecular weight than naphtha to produce gasoline hydrocarbons, and also in the catalytic treatment of naphtha hydrocarbons for the production of gasoline hydrocarbons of improved character, the catalyst becomes contaminated with carbonaceous material during continued use under conversion conditions. Consequently, after the catalyst has been maintained on-stream for a period of time it becomes less effective as a catalyst due to the accumulation of carbonaceous material upon the catalyst particles. Therefore it is customary to take the catalyst off-stream and subject it to treatment with a reactivating gas containing oxygen so as to effect removal of the carbonaceous material from the catalyst by combustion.

The present invention contemplates subjecting the catalyst containing carbonaceous material to treatment with gas containing free oxygen and a substantial amount of water vapor. The invention also contemplates carrying out the reactivation so that the heat of combustion is substantially entirely removed as sensible heat of the reactivating gas. The heat of combustion is thus removed without subjecting the catalyst to indirect contact with a fluid heat carrying medium.

The invention contemplates provisions for extracting both sensible and latent heat from the stream of vent gas being discharged from the system or from that portion of the effluent gas not being recycled through the catalyst mass.

When the catalyst undergoing reactivation is in the form of a solid mass of substantial dimensions it is important to realize rapid and effective removal of the heat of combustion so that no portion of the catalytic material will be exposed to excessively high temperatures such as would result in deactivation or destruction of the catalyst. Accordingly, a feature of the present invention involves employing reactivating gas which contains a large amount of water vapor, for example, 40 to 60% by volume of the gas. The presence of this large amount of water vapor in the gas renders the reactivating gas capable of receiving a large amount of heat directly by radiation from the catalyst surface. This is in addition to the heat transferred from the catalyst surfaces to the reactivating gas by convection. Since the temperatures on the surfaces of the catalyst particles are very high due to combustion it is thus advantageous to effect transfer of as large amount of the heat of combustion as possible from the catalyst to the gas by radiation.

The coefficient of radiant heat transfer from the catalyst surface to water vapor is relatively much greater than is the coefficient of heat transfer to nitrogen which is usually present in the major proportion in ordinary flue gas. Accordingly, the present invention contemplates employing as the reactivating means a gas of reduced nitrogen content.

The invention has particular application to the reactivation of catalyst masses employed in a fixed bed type of catalytic conversion. In this type of operation two or more reactors are usually employed, one reactor being maintained on-stream while the other is off-stream. During the on-stream period the reactant material such as a stream of hydrocarbons is continuously passed through the catalyst mass within the reactor which is maintained under reaction conditions adapted to effect the desired conversion reaction and during which reaction carbonaceous material is deposited upon the solid particles of catalyst within the catalyst mass. During the off-stream period the contact mass undergoes reactivation by the passage through the mass of a stream of oxygen-containing gas so that carbonaceous material is removed from the catalyst mass as gaseous products of combustion.

The invention will now be described in more detail by reference to the accompanying drawing illustrating a method of fluid flow employed in the regeneration of a fixed catalyst mass employed in the cracking of hydrocarbon oil.

The fluid flow employed during the oil cracking operation is not illustrated for, as is well understood in the art, the oil is vaporized and heated to a temperature which may range from 900 to 1000° F. A stream of the heated oil vapor is continuously passed through the catalyst mass which is on-stream for a period of time ranging from a few minutes to a few hours. As disclosed, for example, in Eastman and Richker Patent 2,319,590, the catalyst mass may be maintained on-stream for a period ranging from 4 to about 20 hours, after which the stream of heated feed vapors is diverted to an adjacent reactor to permit reactivation of the first-mentioned reactor.

Referring now to the drawing, numerals 1 and 2 designate catalytic chambers such as the chambers 19 and 20 referred to in Fig. 1 of the previously mentioned Eastman-Richker patent.

During reactivation the reactivating gas stream is forced by a turbine-driven impeller 3 through a pipe 4 communicating with a pipe manifold leading into the top of either of the reactors 1 and 2. The reactivating gas flows downwardly through the catalyst mass contained within the reactor which is off-stream and discharges therefrom at an elevated temperature of about 1100–1200° F. into a pipe manifold leading from the bottom of the reactors and communicating with a pipe 5.

Pipe 5 terminates in branch pipes 6 and 7, each having a control valve 8 and 9 respectively.

Branch pipe 6 communicates directly with the suction of the impeller 3. Branch pipe 7 communicates with a waste heat boiler 10.

That portion of the effluent gas stream comprising flue gas containing a large amount of water vapor which passes through the waste heat boiler 10 is reduced in temperature so as to effect condensation of its water vapor content. Condensation is effected during passage through the waste heat boiler by indirect heat exchange with water introduced to the boiler from a source not shown through a pipe 11.

The boiler 10 is advantageously maintained under about atmospheric pressure so that the water introduced from the pipe 11 is converted into low pressure steam which steam is continuously discharged through a pipe 12. It can be maintained at any desired pressure through a suitable valve in the pipe 12. This steam may be used as process steam in the refinery.

The flue gas stream containing condensed water passes from the boiler 10 through a pipe 13 to a separating vessel 14 wherein separation is effected between the water and flue gas. The flue gas is continuously discharged from the separator through a pipe 15 while the water is drawn off through the pipe 16 leading to an exchanger 17 wherein the water is advantageously cooled to about atmospheric temperature.

The cooled water is discharged into a tank 18 and from the tank 18 is conducted through a pipe 19 communicating with the previously mentioned pipe 6. In this way the condensed water is injected into the flue gas stream entering the suction of the impeller 3.

Air or oxygen from a source not shown is injected by means of a compressor 20 into the previously mentioned pipe 4.

The amount of air so injected is controlled so that the amount of free oxygen contained in the gas flowing through the pipe 4 does not exceed about 1–2% by volume.

The volume of gas circulated through the system comprising the off-stream reaction vessel, waste heat boiler, pipes and impeller, etc. may amount to about 200,000 cubic feet per hour per 100 cubic feet of system volume. Of this 200,000 cubic feet, approximately 4% by volume comprises air injected by the compressor 20.

The amount of water injected through the pipe 19 may be equivalent to about 10,000 to 11,000 cubic feet of steam at standard conditions per 100 cubic feet of system volume.

Some water vapor is formed during the reactivation as the result of conversion of the hydrogen content in the catalyst mass to water, and the amount of water so formed may be equal to about 10% of the water being circulated through the system. Provision is thus made for supplying make-up water to the system through pipe 21. Such make-up water is advantageously treated to insure its freedom from sodium and other compounds which would exert an adverse effect upon the catalyst. For this reason it is advantageous to reinject into the system water formed in the reactivation reaction since such water should be free from impurities which would cause catalyst deterioration.

In the practice of the invention the proportion of effluent gas diverted through the branch pipe 7 to the waste heat boiler 10 will amount to about 10% to 20% volume of the total gas passing through the pipe 5. The amount so diverted is such that upon reinjection of water through the pipe 19 the temperature of the gaseous mixture entering the suction of the impeller 3 will not exceed about 900–950° F. and during the major portion of the reactivation period will not exceed about 750–850° F.

Thus during the initial portion of the reactivation period it may be necessary to maintain the entering reactivating gas stream at a temperature of about 900–950° F. so as to initiate combustion. After combustion has commenced, however, it can usually be maintained with the entering gas at a temperature reduced to about 750–850° F.

The amount of circulating gas and the free oxygen contained therein is controlled so that all of the heat of combustion is removed as sensible heat in the gas stream flowing through the pipe 5, the temperature of said gas stream being not in excess of about 1200° F.

Besides improving the heat transfer characteristic of the reactivating gas the injection of water into the impeller suction permits close control of temperature at this point. This is advantageous in order to maintain the temperature within the safe limits for the material of construction of the impeller. It is advantageous to maintain the temperature of the impeller suction as low as practical in order to obtain a high capacity for a given impeller speed.

Since the oxygen content of the reactivating gas stream is maintained relatively low the rate of combustion is restricted so as to facilitate carrying off the heat of combustion in the effluent gas stream. It is contemplated extending the reactivation over a period of time which may amount to several hours or which may amount to about 75% of the length of time the reactor is maintained on-stream during hydrocarbon conversion.

The catalyst reactivation is advantageously effected under elevated pressure, for example in the range 100 to 400 pounds per square inch gauge. It is contemplated that prior to introduction of the oxygen-bearing reactivating gas the catalyst mass can be purged with oxygen-free gas to displace hydrocarbon vapors therefrom prior to the introduction of the oxygen-bearing gas. Likewise, the reactor catalyst mass may be subjected to purging with oxygen-free gas prior to placing on-stream.

It is contemplated that the reactivation may be carried out under pressure differing substantially from the pressure prevailing during the conversion reaction, and in such case provision is made for reducing or increasing the pressure within the catalyst chamber as the case may be prior to introduction of the reactivating gas stream. Where necessary provision may also be made for such repressuring subsequent to the reactivating step.

The type of catalyst employed in the reaction chambers 1 and 2 may be similar to those referred to in the previously mentioned Eastman-Richker Patent 2,319,590. However, it is contemplated that the invention has application to the reactivation of any type of conversion catalyst employed in any type of hydrocarbon oil conversion wherein reactivation of the catalyst involves combustion of carbonaceous material deposited upon the catalyst during the catalytic conversion.

Mention has already been made of injecting a specific proportion of water into the system. It is contemplated, however, that the actual amount injected may vary considerably from that mentioned. Usually, however, it is desirable to maintain the water vapor content of the circulating stream of reactivating gas in the range about 40–60% by volume of the total gas stream. Likewise, the actual volumes of total gas circulated per hour may vary substantially from those previously mentioned.

Obviously many modifications and variations of the invention, as hereinbefore set forth, may be made without departing from the spirit and scope thereof, and therefore only such limitations should be imposed as are indicated in the appended claims.

I claim:

1. In the reactivation, with oxygen containing gas, of a catalyst mass contaminated with carbonaceous material produced in the treatment of hydrocarbons at cracking temperatures with said catalyst, so as to remove said contaminating material as gaseous products of conversion, said products including water formed in situ, and said catalyst being susceptible to deterioration by contact with sodium compounds, the steps comprising continously passing through the mass during reactivation a stream of reactivating gas containing a small amount of free oxygen and about 40 to 60% of water vapor free from sodium compounds, maintaining the gas entering said mass at not in excess of about 950° F., maintaining the volume of gas flowing through the mass sufficiently large to remove the heat of combustion substantially entirely as sensible heat of the gas issuing from the mass and such that the temperature of the mass does not exceed about 1200° F., splitting the issuing gas into streams of major and minor proportions respectively, recycling the stream of major proportion through said mass, condensing water vapor from the stream of minor proportion, discharging gas from which water vapor has been condensed, injecting said condensed water into the recycling gas stream in an amount and at a temperature sufficient to maintain said entering gas temperature not in excess of about 950° F., injecting into the recycling gas stream as make-up water only extraneous water which is free from sodium compounds and supplying free oxygen to the recycling gas in an amount sufficient to compensate for oxygen consumed in combustion of carbonaceous material.

2. The method according to claim 1 in which the condensed water is injected into the recycling gas stream in an amount and at a temperature sufficient to maintain said entering gas temperature within the range about 750 to 950° F.

CHARLES RICHKER.

REFERENCES CITED

The following references are of record in the file of this patent:

UNITED STATES PATENTS

| Number | Name | Date |
|---|---|---|
| 1,957,645 | Houdry | May 8, 1934 |
| 2,211,211 | Kassel | Aug. 13, 1940 |
| 2,225,402 | Liedholm | Dec. 17, 1940 |
| 2,310,962 | Lassiat | Feb. 16, 1943 |
| 2,316,260 | Lee et al. | Apr. 13, 1943 |
| 2,338,581 | Guyer | Jan. 4, 1944 |
| 2,344,770 | Gunness | Mar. 21, 1944 |
| 2,346,750 | Guyer | Apr. 18, 1944 |
| 2,356,680 | Maranick | Aug. 20, 1944 |
| 2,367,351 | Hemminger | Jan. 16, 1945 |
| 2,396,157 | Claussen | Mar. 5, 1946 |